(12) United States Patent
Shnol

(10) Patent No.: US 9,181,666 B2
(45) Date of Patent: Nov. 10, 2015

(54) UNIVERSAL GARBAGE PICK-UP TOOL

(71) Applicant: Lev Y. Shnol, Pittsburgh, PA (US)

(72) Inventor: Lev Y. Shnol, Pittsburgh, PA (US)

(*) Notice: Subject to any disclaimer, the term of this patent is extended or adjusted under 35 U.S.C. 154(b) by 0 days.

(21) Appl. No.: 14/480,826

(22) Filed: Sep. 9, 2014

(65) Prior Publication Data

US 2015/0101635 A1    Apr. 16, 2015

Related U.S. Application Data

(60) Provisional application No. 61/889,128, filed on Oct. 10, 2013, provisional application No. 62/002,378, filed on May 23, 2014.

(51) Int. Cl.
*E01H 1/12*    (2006.01)
*B25J 1/04*    (2006.01)

(52) U.S. Cl.
CPC ... *E01H 1/12* (2013.01); *B25J 1/04* (2013.01); *E01H 2001/1226* (2013.01); *E01H 2001/1233* (2013.01)

(58) Field of Classification Search
CPC .............. E01H 1/12; E01H 2001/1233; E01H 2001/1226; E01H 2001/1266; E01H 2001/1293; A61H 2003/0222; B25J 1/04
USPC ............. 294/24, 61, 100, 209, 190; 15/257.1, 15/257.2
See application file for complete search history.

(56) References Cited

U.S. PATENT DOCUMENTS

| | | | | |
|---|---|---|---|---|
| 2,794,667 A * | 6/1957 | Bissitt | ......................... | 294/50.7 |
| 3,093,402 A * | 6/1963 | Sisson | ......................... | 294/100 |
| 3,873,143 A | 3/1975 | Foust | | |
| 4,463,981 A * | 8/1984 | Curry | ......................... | 294/100 |
| 4,856,835 A | 8/1989 | Pacione | | |
| 6,065,787 A * | 5/2000 | Jarosch | ........................ | 294/210 |
| 6,315,340 B1 * | 11/2001 | Chen | .............................. | 294/24 |
| 6,412,840 B1 * | 7/2002 | Wen | ................................ | 294/24 |
| 2007/0114806 A1 | 5/2007 | Ferguson | | |
| 2011/0170281 A1 | 7/2011 | Shih | | |
| 2011/0197825 A1 | 8/2011 | Jan | | |

* cited by examiner

*Primary Examiner* — Dean Kramer
(74) *Attorney, Agent, or Firm* — The Webb Law Firm

(57) ABSTRACT

A universal garbage pick-up tool includes a main body, an inner support tube, at least two guard members positioned between the main body and inner support tube, a pushing rod positioned within the inner support tube, a push button operatively connected to a proximal end of each guard member and a proximal end of the pushing rod, and a plurality of spring claws attached to a distal end of the pushing rod. The spring claws are positioned within the inner support tube, and the guard members and the spring claws are released upon the actuation of the push button, thereby allowing the spring claws to extend axially from a distal end of the main body. An adjustment ring may be attached to the distal end of the main body, including at least two pins circumferentially spaced apart. A magnet may be positioned within the push button of the pick-up tool.

20 Claims, 22 Drawing Sheets

UNIVERSAL GARBAGE PICK-UP TOOL

CROSS REFERENCE TO RELATED APPLICATIONS

This application claims priority to U.S. Provisional Application No. 61/889,128, filed Oct. 10, 2013, and U.S. Provisional Application No. 62/002,378, filed May 23, 2014. The disclosure of each of these documents is hereby incorporated by reference in its entirety.

BACKGROUND OF THE INVENTION

1. Field of the Invention

This disclosure relates generally to a universal pick-up tool and, more particularly, to a universal garbage pick-up tool with multiple methods for grasping and releasing garbage and other materials.

2. Description of Related Art

Pick-up tools used in industrial, custodial, and/or household environments are well known and various in design. However, despite the increasing needs of the individuals using these pick-up tools and advances in pick-up tool configurations, the ease of use and the lack of methods for picking up materials has been a continuing problem.

Currently known pick-up tools include a main body, an actuating handle, and pincers for picking up and depositing hard-to-reach objects either stored on a high surface or left on the ground. Particularly, in the custodial environment, individuals spend a significant amount of time picking up refuse and/or small objects that have fallen to the ground. Quite often these pick-up tools are non-adjustable and are too short for the individual, so that they must bend over to pick up any objects, or these pick-up tools require a constant pressure to be applied to the handle to keep the object restrained in the pincers of the pick-up tool. Most of these pick-up tools are designed to pick up objects from two sides, which makes it difficult to grab flat and small objects. These problems can lead to back problems for the individuals or multiple attempts at picking up an object when moving it to a different location, such as a waste bin or garbage bag.

Another problem with current pick-up tools is the lack of methods available for an individual to pick up materials of different size, weight, and material. Current pick-up tools include a single pair of pincers, or a gripper used to grab objects from high or unreachable places. These pincers can often be unwieldy and difficult to maneuver because they are designed to pick up larger objects such as cans or boxes. However, it is difficult to pick up flat and small objects such as paper, cardboard, or metal objects without some difficulty in using the pincers of the pick-up tool. Additionally, most current pick-up tools fail to include more than one option for picking up objects. Often the pick-up tool will only include a pair of pincers, or only a magnet for picking up metal objects, or only a rod for the stabbing of different objects.

SUMMARY OF THE INVENTION

Accordingly, there is a general need in the art for a universal pick-up tool that allows an individual to pick up different types of objects using different types of methods. There is also a need for a pick-up tool which provides comfort for an individual when using the pick-up tool. Lastly, there is a need for a pick-up tool which can hold and retain a picked-up object without the need for an individual to keep an actuation member of the pick-up tool engaged for the duration of time that the object is held.

According to one embodiment of the present invention, a universal garbage pick-up tool is provided. The universal garbage pick-up tool includes a main body extending along a longitudinal axis between a distal end and a proximal end, an inner support tube inside the main body along a longitudinal axis, at least two guard members positioned between the main body and the inner support tube, the guard members each extending along the longitudinal axis of the main body between a proximal end and a distal end, a pushing rod positioned within the inner support tube, the pushing rod extending along the longitudinal axis between a proximal end and a distal end, a push button operatively connected to the proximal end of each guard member and the proximal end of the pushing rod, and spring claws attached to the distal end of the pushing rod. The spring claws are positioned within the inner support tube. The guard members and the spring claws are extended upon the actuation of the push button, thereby allowing the spring claws to extend longitudinally and axially from the distal end of the main body.

An adjustment ring can be attached to the distal end of the main body and may include at least two pins circumferentially spaced apart from one another. The adjustment ring are moved along the longitudinal axis of the main body to adjust an exposed length of each pin. An adjustment screw may be attached to each of the at least two pins. The adjustment screws may be configured to extend the pins from the adjustment ring upon rotation of the adjustment screws in a first direction and to retract the pins into the adjustment ring upon rotation of the adjustment screws in a second direction. A magnet can be positioned within the push button. An extending rod can be positioned within the main body, including a handle on a proximal end of the extending rod which allows for actuation of the extending rod. A broom attachment may be positioned on the main body. The broom attachment may be slidable along the longitudinal axis of the main body. The broom attachment may include at least one lighting arrangement. A waste collection apparatus may be used in conjunction with the pick-up tool. The waste collection apparatus may include a handle, a body connected to the handle, and a bag attached to one end of the body. A locking mechanism may be attached to an end of the bag opposite the end of the bag attached to the body of the waste collection apparatus. The locking mechanism may be configured to hold the bag shut during use of the waste collection apparatus. A dust pan apparatus may be removably attached to the main body of the pick-up tool. The dust pan apparatus may include a handle and a dust pan connected to the handle. A resilient member may be positioned in the push button and on proximal ends of the least two guard members. The resilient member may create a biasing force on the at least two guard members so, when a pressure on the push button is released, the resilient member forces the at least two guard members back into an original position. The at least two guard members may be configured to extend from the main body before the plurality of spring claws extend from the main body upon actuation of the push button.

According to another embodiment of the present invention, a method of retrieving and picking up refuse and other materials is provided. The method includes the step of providing a universal garbage pick-up tool, including a main body extending along a longitudinal axis between a distal end and a proximal end, an inner support tube inside the main body along a longitudinal axis, at least two guard members positioned between the main body and the inner support tube, the guard members each extending along the longitudinal axis of the main body between a proximal end and a distal end; a pushing rod positioned within the inner support tube, the pushing rod extending along the longitudinal axis between a proximal end and a distal end, a push button operatively connected to the proximal end of each guard member and the proximal end of the pushing rod, and a plurality of spring claws attached to the distal end of the pushing rod. The spring claws are positioned within the inner support tube. The method further includes the steps of: actuating the push button to a first position by pressing down the push button towards the distal end of the main body until a spring positioned between the push button and the main body is fully compressed, thereby extending the guard members before the spring claws in a longitudinal direction from the distal end of the main body and allowing the extended spring claws to pick-up a desired object once distal ends of the guard members have touched a surface; further actuating the push button to a second position that compresses a spring element positioned within the push button, thereby changing the relative positions of the guard members and the spring claws, causing the spring claws to touch the surface and extend in a radial direction from the distal end of the main body, and allowing the desired object to be picked up and held by the spring claws; releasing pressure on the push button causing the spring claws and guard members to retract into the main body of the pick-up tool to hold the desired object in the spring claws; and pressing the push button down again to open the spring claws, thereby releasing the object in a new location.

The method can also include the steps of further providing a magnet within the push button of the pick-up tool, and holding a distal end of the pick-up tool to press the magnet and push button against a metal object, thereby picking up the metal object. The method can further include the steps of providing an adjustment ring attached to the distal end of the main body of the pick-up tool, the adjustment ring including at least two pins circumferentially spaced apart from one another on the adjustment ring, stabbing a desired object with the pins of the adjustment ring, thereby retaining, lifting, and carrying the desired object, and actuating the push button of the pick-up tool to extend the guard members from the main body, thereby pressing against the desired object and releasing the object from the pins. The method can further include the steps of providing an extending rod positioned within the main body of the pick-up tool, the extending rod including a handle on a proximal end of the extending rod which allows for actuation of the extending rod, moving the handle towards a distal end of the main body of the pick-up tool, thereby extending the extending rod from the main body, stabbing a desired object, thereby retaining, lifting, and carrying the desired object, and moving the handle towards a proximal end of the main body of the pick-up tool, thereby retracting the extending rod into the main body and releasing the desired object from the pick-up tool. The method can further include the steps of providing a broom attachment on the main body of the pick-up tool, and sweeping a desired object with the broom attachment. The method can further include the steps of providing a broom attachment on the main body of the pick-up tool and at least one of a waste collection apparatus or a dust pan apparatus removably attached to the main body of the pick-up tool, sweeping a desired object with the broom attachment into the waste collection apparatus or dust pan apparatus, and emptying the desired object from the waste collection apparatus or dust pan apparatus into a waste receptacle.

Further details and advantages of the various embodiments of the invention detailed herein will become clear upon reviewing the following detailed description of the preferred embodiments in conjunction with the accompanying drawing figures.

BRIEF DESCRIPTION OF THE DRAWINGS

FIG. 4b is a perspective view of the extended spring claws and guard members on a distal end of the pick-up tool in FIG. 4a.

DESCRIPTION OF THE PREFERRED EMBODIMENTS

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present invention is directed to, in general, a universal garbage pick-up tool and, in particular, a universal garbage pick-up tool with several methods for picking up and releasing objects. Certain preferred and non-limiting embodiments of the components of the pick-up tool are illustrated in FIGS. 1-19. A detailed description of the pick-up tool will be described first, followed by a detailed description of the method of use of the pick-up tool.

Figure 1:
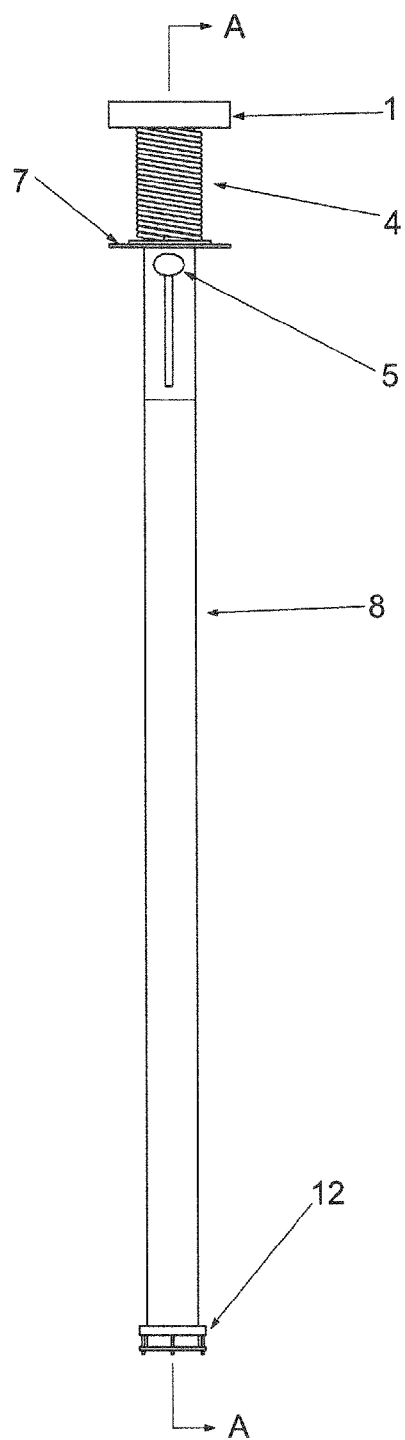
FIG. 1 is a perspective view of a universal garbage pick-up tool in accordance with an embodiment of this disclosure.
Figure 2A:
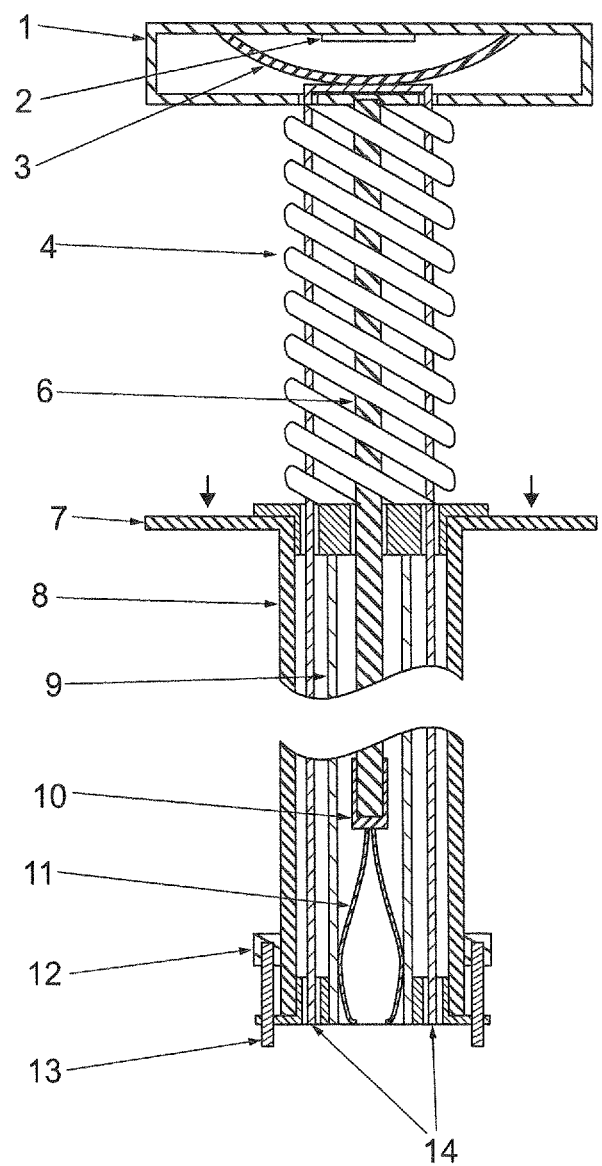
FIG. 2a is a front cross-sectional view of the pick-up tool of FIG. 1 along the line A-A showing the pick-up tool in a position used to pick up rigid materials.
Figure 2B:
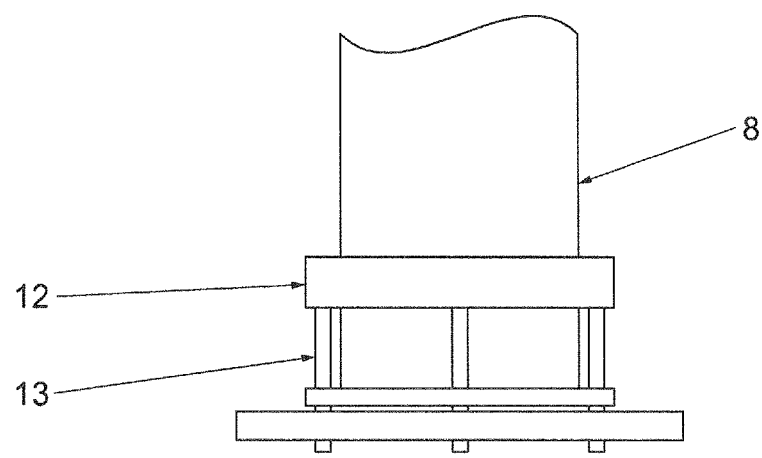
FIG. 2b is a perspective view of an adjustment ring on a distal end of the pick-up tool of FIG. 2a with pins and a grabbed rigid object.

With reference to FIGS. 1, 2a, and 2b, a universal garbage pick-up tool is shown. The pick-up tool includes a main body 8 that extends along a longitudinal axis from a proximal end to a distal end. The main body 8 may be a hollow, cylindrical tube; however, additional tube shapes may be used. The proximal end of the main body 8 includes a flange or base plate 7, which extends circumferentially around the proximal end of the main body 8. The length of the main body 8 from the proximal end to the distal end may vary depending on the height of the individual using the pick-up tool. In one embodiment, the length of the main body 8 may be 24-30 inches. An inner support tube 9 may be positioned within the main body 8 and may have a corresponding shape and length to the main body 8. In one embodiment, the inner support tube 9 is cylindrical just as the main body 8 is cylindrical. Disposed between the main body 8 and the support tube 9 are guard members 14 that extend longitudinally from the distal end to the proximal end of the main body 8. The guard members 14 are slidable within the main body 8 and, therefore, can extend longitudinally out from the distal and proximal ends of the main body 8. In one embodiment, two guard members 14 are included in the main body 8.

Figure 3A:
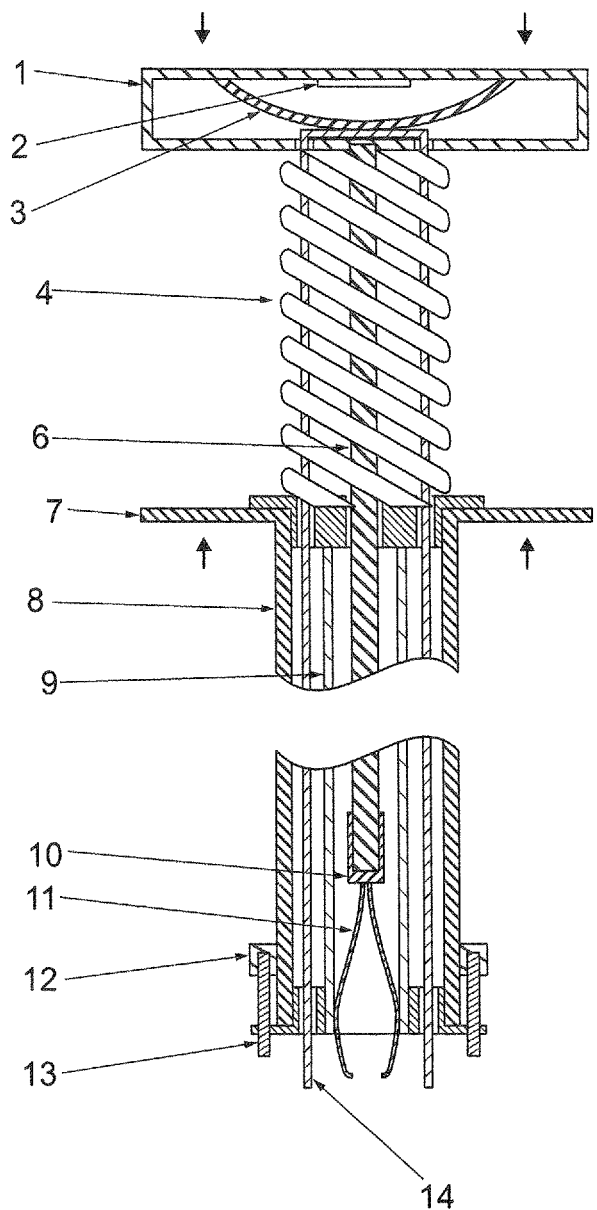
FIG. 3a is a front cross-sectional view of the pick-up tool of FIG. 1 along the line A-A showing the pick-up tool in a position to release the rigid materials.
Figure 4A:
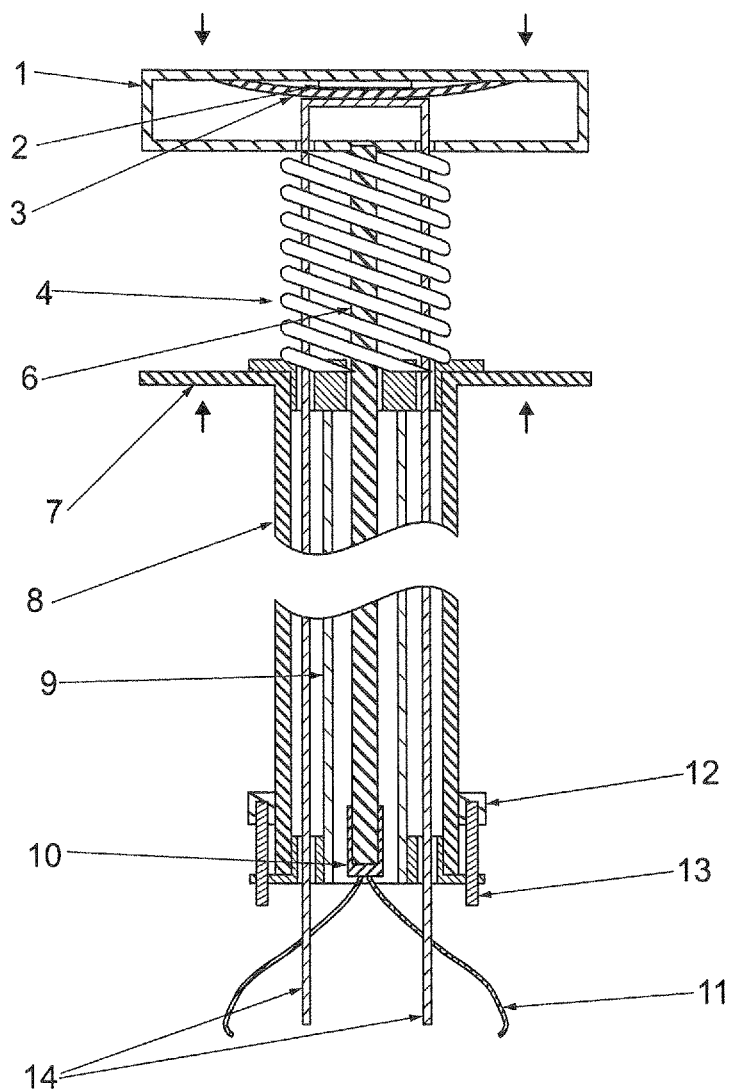
FIG. 4a is a cross-sectional view of the pick-up tool of FIG. 1 along the line A-A showing the pick-up tool in a position wherein the spring claws and guard members extend to pick up soft materials.
Figure 4B:
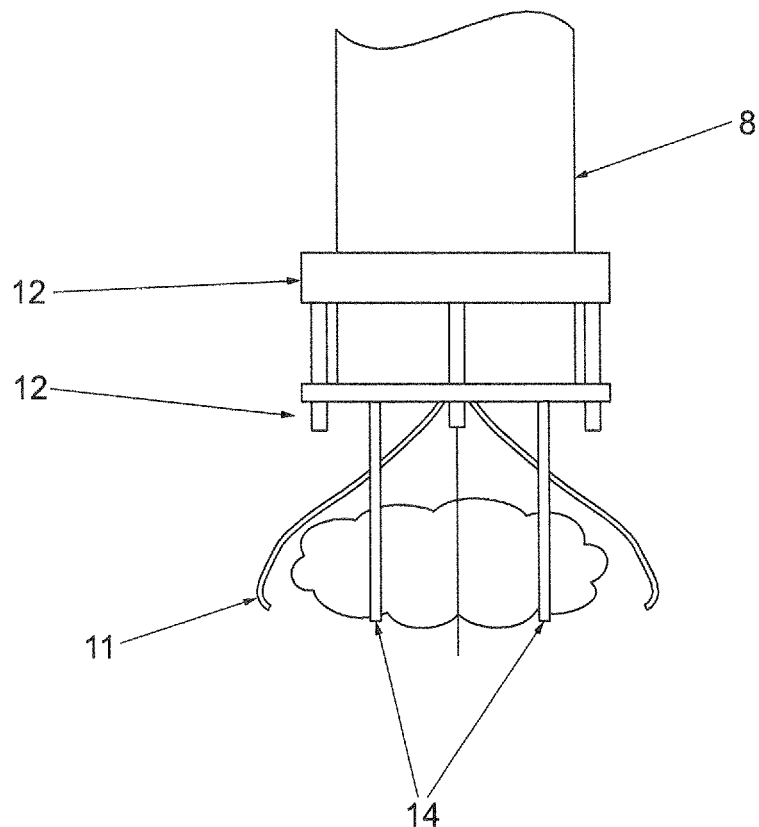

As shown in FIGS. 1, 2a, 3a, 4a, 5, 6, and 8, in one embodiment, a push button 1 is positioned on a proximal end of each guard member 14. The guard members 14 are slidable within the push button 1 and can extend into a cavity of the push button 1. The shape of the push button 1 generally corresponds to the shape of the main body 8, but additional shapes are contemplated. The push button 1 includes a cavity for holding a magnet 2 and a resilient member, such as a spring element 3. The resilient member may also be a deformable, resilient metal member or a rubber member that is capable of deforming and retracting to an original position. As shown in FIG. 2a, the magnet 2 may be attached to a top surface or proximal end of the inner cavity of the push button 1. As shown in FIGS. 2a, 3a, and 4a, the spring element 3 may be U-shaped and include two ends that are each positioned on the inner, top surface or proximal end of the inner cavity of the push button 1. Additional shapes for the spring element 3 are also contemplated, such as a wave-like arrangement or elements that extend from a distal end of the push button 1 to the proximal end of the push button 1 similar to a column-like structure. As shown in FIGS. 2a, 3a, and 4a, the spring element 3 may be used to position the guard members 14 and a plurality of spring claws 11 (described in detail hereinbelow) relative to one another and/or the main body 8. As shown in FIG. 4a, upon the guard members 14 being extended into the push button 1 cavity due to pressure on the distal ends of the guard members 14 from a hard surface, such as the ground, the spring element 3 may be compressed. In this compressed state, the spring element 3 is biased in a distal direction towards the main body 8, thereby urging the guard members 14 in a direction away from the distal end of the main body 8 upon the release of pressure on the guard members 14.

With reference to FIG. 2a, a pushing rod 6 may be positioned within the inner support tube 9 of the pick-up tool. The pushing rod 6 extends from a bottom surface of the push button 1 to the spring claws 11. In one embodiment, the plurality of spring claws 11 are attached to a distal end of the pushing rod 6 by using a connecting member 10. It is also contemplated that additional types of claws could be used to perform the same function as the spring claws 11. Different numbers of pincers can be used with the spring claws 11, including, for example, two or three pincers. The number of pincers needed will depend on the types of objects that are intended to be picked up by the pick-up tool. The connecting member 10 provides secure attachment of the spring claws 11 to the pushing rod 6. The connecting member 10 may be configured to slide onto the end of the pushing rod 6 in a tightly secure connection via, for example, a friction fit or snap-fit connection. As shown in FIGS. 3a and 4a-5, in operation, the pushing rod 6 is extended from the distal end of the pick-up tool when the push button 1 is pressed down. As the push button 1 is pressed further downward, the spring claws 11 also begin to extend from the pick-up tool. Once the spring claws 11 have sufficiently extended from the pick-up tool, the spring claws 11 begin to spread outwards in a radial direction from the pick-up tool, thereby increasing the radial coverage of the spring claws 11. As the spring claws 11 are extended further out of the pick-up tool, the diameter of the spring claws 11 from pincer to pincer increases.

Figure 5:
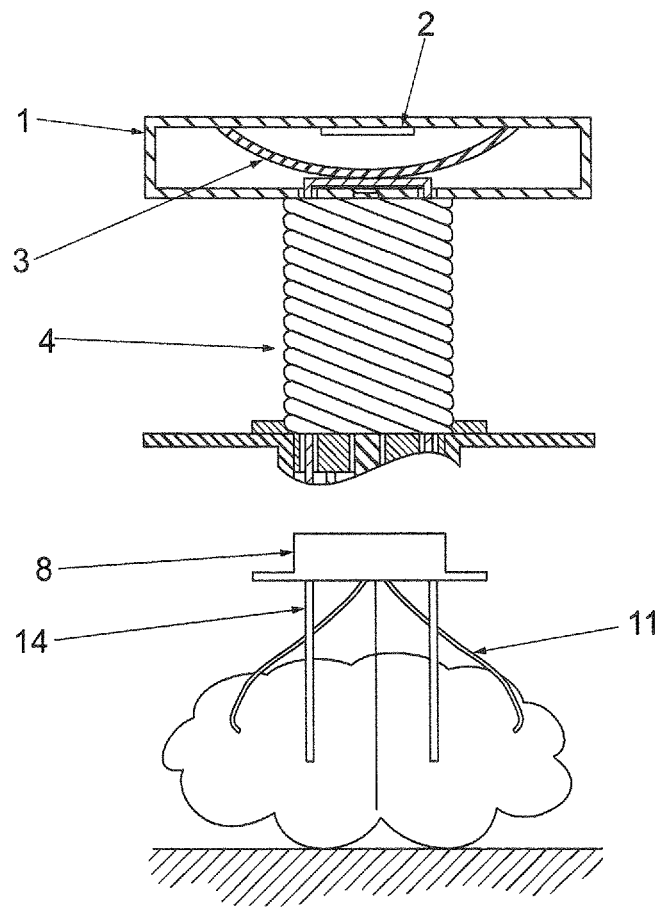
FIG. 5 is a front cross-sectional view of the pick-up tool of FIG. 1 along the line A-A showing the pick-up tool in a position of picking up soft material with a push button, wherein the spring element, guard members, and spring claws are in a first position.

As shown in FIGS. 1, 2a, 3a, 4a, 5, and 6, in one embodiment, a compression main spring 4 may be positioned between the push button 1 and the base plate 7. This main spring 4 extends from a bottom surface or distal end of the push button 1 to a top surface of the base plate 7. The main spring 4 is positioned around the guard members 14 and the pushing rod 6, which each extend along the longitudinal axis from the main body 8 of the pick-up tool to the push button 1. In one embodiment, the guard members 14 and the spring claws 11 may not extend from the main body 8 until the push button 1 has been pushed down a sufficient distance. The main spring 4 may be biased so as to urge the push button 1 away from the main body 8 of the pick-up tool. As shown in FIG. 5, once the push button 1 has been pressed down sufficiently to compress the main spring 4, the guard members 14 and the spring claws 11 extend from the main body 8. After pressure is released from the push button 1, the main spring 4 urges the push button 1 back into its original position, thereby retracting the guard members 14 and the spring claws 11 back into the main body 8.

As shown in FIG. 2b, an adjustment ring 12 may be included on a distal end of the main body 8 of the pick-up tool. The adjustment ring 12 may extend circumferentially around the main body 8. In one embodiment, a plurality of pins 13 may be inserted into slots around the adjustment ring 12 and are spaced circumferentially around the adjustment ring 12. In one embodiment, four pins 13 are spaced around the adjustment ring 12. However, additional or fewer pins could be used depending on the materials that must be picked up by the pick-up tool. Distal ends of the pins 13 extend longitudinally out from the distal end of the adjustment ring 12. As shown in FIG. 2b, this permits an individual to pick up objects on the ground by stabbing the objects with the pins 13. In one embodiment, the adjustment ring 12 may be moved along the longitudinal axis to adjust the exposed length of the pins 13. By adjusting the exposed length of the pins 13, an individual may stab thicker, larger objects than could normally be done with a shorter length of the pins 13 exposed. When the adjustment ring 12 is moved toward the distal end of the main body 8, the pins 13 become more exposed or extend further from the distal end of the main body 8. The adjustment ring 12 may also be moved towards the proximal end of the main body 8 to shorten the exposed length of the pins 13. Shock absorption elements for the adjustment ring 12 may be used to prevent the pins 13 from being damaged by hitting a hard surface.

Figure 19:
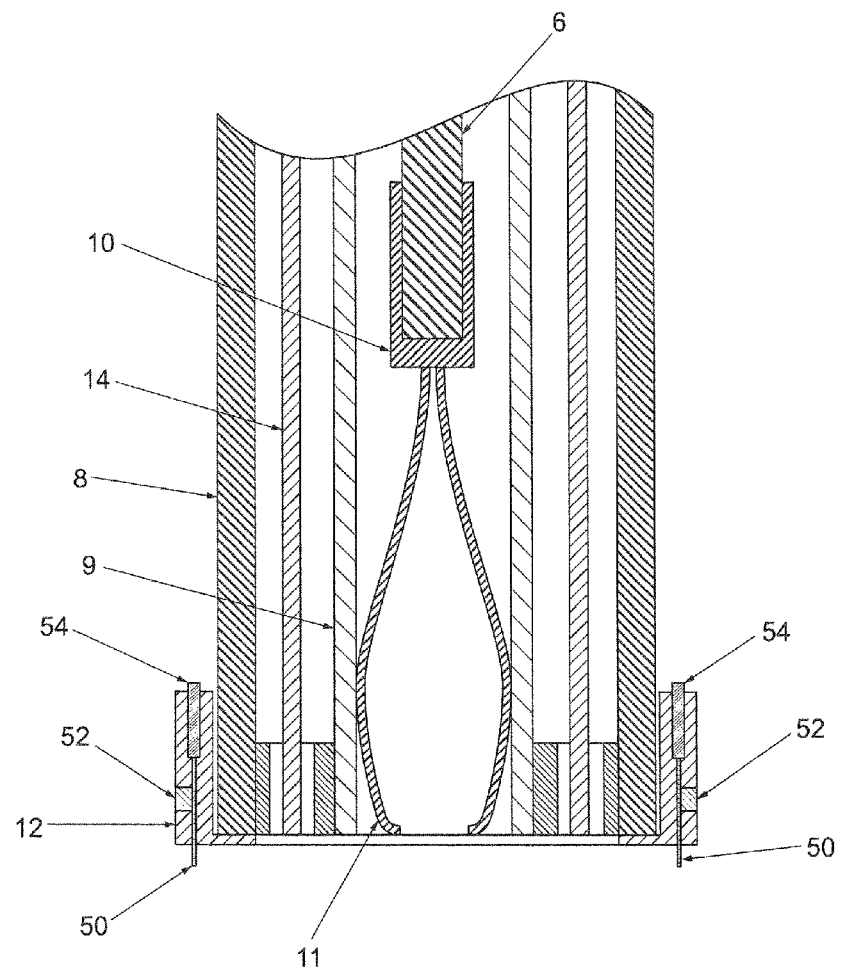
FIG. 19 is a front cross-sectional view of another embodiment of the pick-up tool of FIG. 1 along the line A-A.

As shown in FIG. 19, another embodiment of the pick-up tool is contemplated with a different arrangement of pins 50. The pins 50 may be inserted into slots around a pin adjustment ring 12 and may be spaced circumferentially around the pin adjustment ring 12. In this embodiment, the pins 50 are moved relative to the main body 8, instead of the adjustment ring 12 being moved along a longitudinal length of the main body 8. Each pin 50 may be attached to an adjustment member 54, such as a screw, that allows for the adjustment of the length of the pins 50 that is extended from the distal end of the pick-up tool. The adjustment members 54 may be rotated in a first direction to further extend the pins 50 from the pin adjustment ring 12 and in a second direction to further retract the pins 50 into the pin adjustment ring 12. After the pins 50 have been positioned at the desired length, corresponding pin attachments 52, which may be screws, may be tightened to hold the pins 50 in place. As the pin attachments 52 are rotated in a first direction, pressure is applied to the pins 50 by the pin attachments 52 to hold the pins 50 in place and, as the pin attachments 52 are rotated in a second direction, pressure is released from the pins 50 to allow the pins 50 to move within the pin adjustment ring 12. The pin attachments 52 move radially within the pin adjustment ring 12 to tighten the pins 50.

Figure 7:
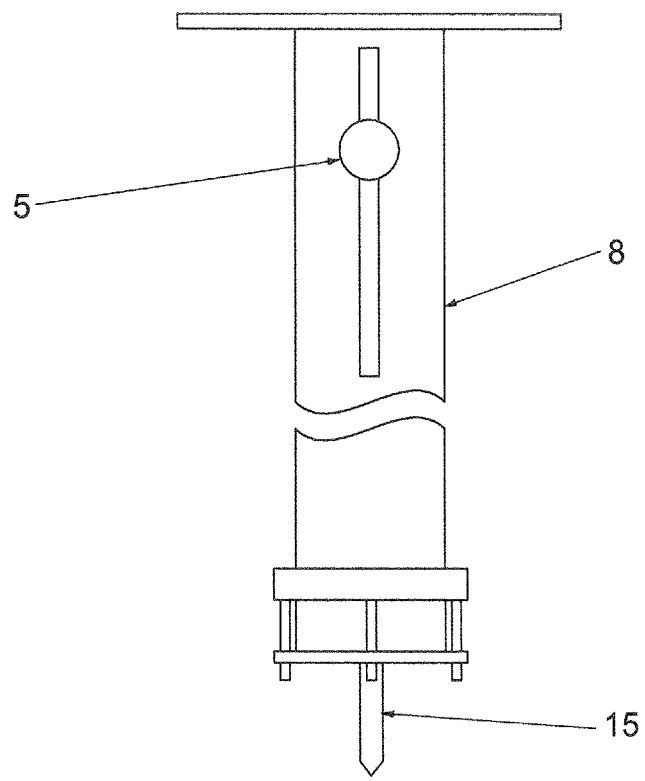
FIG. 7 is a perspective view of a pick-up tool including an extending rod and extending rod handle.

In another embodiment of the pick-up tool, as shown in FIG. 7, an extending rod 15 may also be included inside the main body 8 of the pick-up tool. The extending rod 15 may be positioned between the inner support tube 9 and the main body 8, and may provide an additional method of picking up objects or garbage. A distal end of the extending rod 15 may be sharpened and serrated to assist in this method. As shown in FIGS. 1 and 7, an extending rod handle 5 may be attached to a proximal end of the extending rod 15. The handle 5 extends outward from the main body 8. A slot may be defined in the side of the main body 8 to allow sliding of the handle 5 along the longitudinal axis of the main body 8. When the handle 5 is positioned towards the proximal end of the main body 8, the extending rod 15 is housed within the main body 8 between the inner support tube 9 and the main body 8. When the handle 5 is moved towards the distal end of the main body 8, the extending rod 15 may be extended from the main body 8, thereby allowing an individual to stab an object. The extending rod 15 may be larger in diameter and length than the pins 13 of the adjustment ring 12. This permits an individual to stab and pick up easy to penetrate objects like plastic and aluminum cans. If the objects are placed on a surface that is easily penetrated, such as soil, it is possible to pin several objects consecutively. The handle 5 may be a knob, or, in one embodiment, a hook which allows an individual to carry the pick-up tool by placing the handle 5 in his/her pocket or through a belt loop on his/her pants.

With reference to FIGS. 9-17, several attachments or additional features may be included to form an assembly with the pick-up tool. The attachments are designed to improve the pick-up tool's waste collection abilities and efficiency, as well as, the ease of use of the pick-up tool. As shown in FIGS. 9-12, the pick-up tool may also include a broom attachment 16. The broom attachment 16 may include a broom 17, a broom body 18, a lever 19, and light emitting diode (LED) lights 20a, 20b. The broom 17 may be configured to sweep, push, and/or pull any waste or objects resting on a surface, such as a floor or steps. In one embodiment, the broom 17 may be rectangular in shape. However, it is to be understood that additional shapes for the broom 17 are contemplated, such as square, triangular, or cylindrical. It is also to be understood that the broom 17 may be replaced by a mop, vacuum hose, or squeegee, among other cleaning attachments. The broom 17 may be attached to the broom body 18. The broom body 18 is substantially cylindrical and defines an aperture therethrough for receiving the main body 8 of the pick-up tool. It is to be understood that the cross-sectional shape of the aperture of the broom body 18 corresponds to the cross-sectional shape of the main body 8 to allow the main body 8 to be inserted into the aperture. When positioned on the main body 8 via the broom body 18, the broom attachment 16 is configured to slide up and down the longitudinal length of the main body 8. To arrange the broom attachment 16 in a position for sweeping a surface, the broom attachment 16 may be arranged on the distal end of the main body 8 (shown in FIGS. 9 and 10). If the user has no use for the broom attachment 16, the broom attachment 16 may be moved upwardly towards the proximal end of the main body 8 to an intermediate position on the main body 8 (shown in FIGS. 11 and 12). The broom attachment 16 may be secured to the main body 8 by using the lever 19. The lever 19 may be configured to operate at two different positions, a locked position and an unlocked position. In the unlocked position, the lever 19 may be positioned in a direction towards the proximal end of the main body 8 so that the lever 19 is positioned parallel to the main body 8. In the unlocked position, the broom body 18 may be moved along the longitudinal length of the main body 8. Once the broom attachment 16 is positioned on the desired portion of the main body 8, the lever 19 may be rotated to the locked position. In transition from the unlocked position to the locked position, the lever 19 is rotated from the unlocked position to a position in which the lever 19 is arranged downwardly towards the distal end of the main body 8 so that the lever 19 is angled relative to the longitudinal axis of the main body 8. As the lever 19 is rotated, the broom body 18 is tightened around the main body 8 and locked into place. It is to be appreciated that the lever 19 or broom body 18 includes a contoured or cam surface or similar arrangement that is brought into engagement with the exterior of the main body 8 as the lever 19 is moved into the locked position in order to lock the broom body 18 in a particular position along the longitudinal axis of the main body 8. The broom attachment 16 may also include a lighting arrangement, such as LED lights 20a, 20b, on an outer, circumferential surface of the broom body 18. The LED lights 20a, 20b are configured to direct light towards the surface that is to be cleaned or swept. Additional LED lights may be provided to increase the amount of light that is provided for the pick-up tool. The LED lights 20a, 20b may be turned on and off using a button or remote device, or may be automatically turned on according to the amount of light provided in the room. It is also contemplated that additional and/or alternative lighting arrangements may be used, such as flashlights, laser pointers, and/or solar-powered lights.

Figure 13:
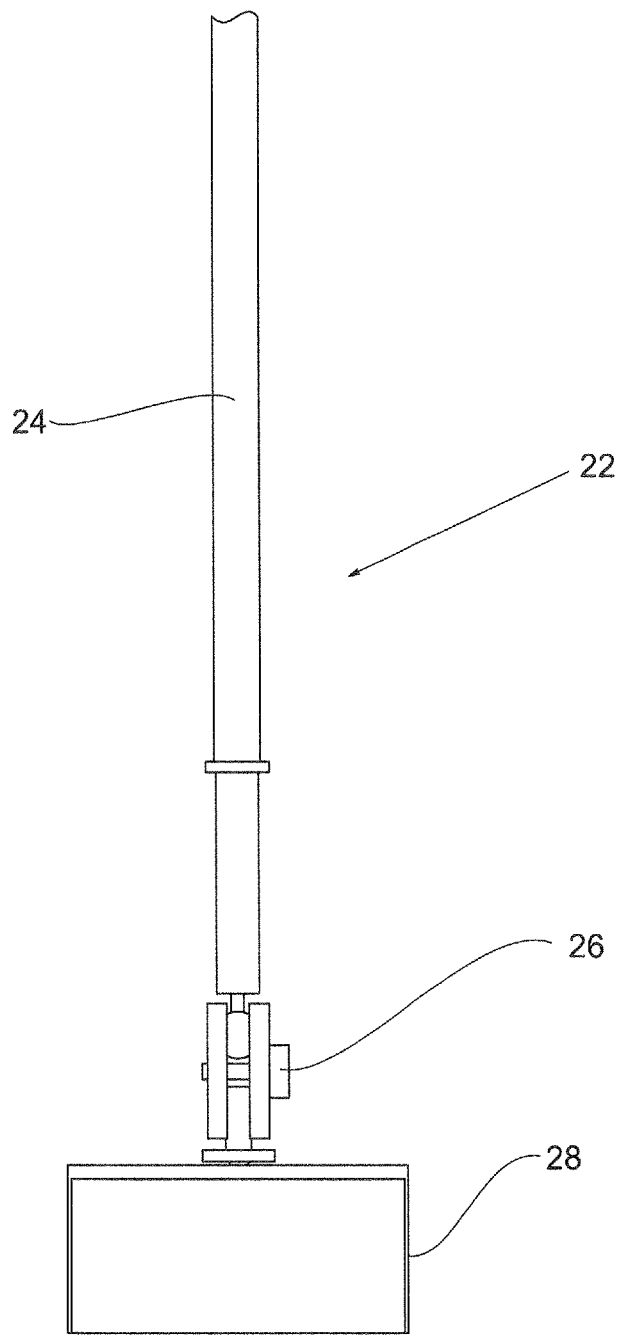
FIG. 13 is a front view of a waste collection apparatus in accordance with this disclosure.
Figure 14:
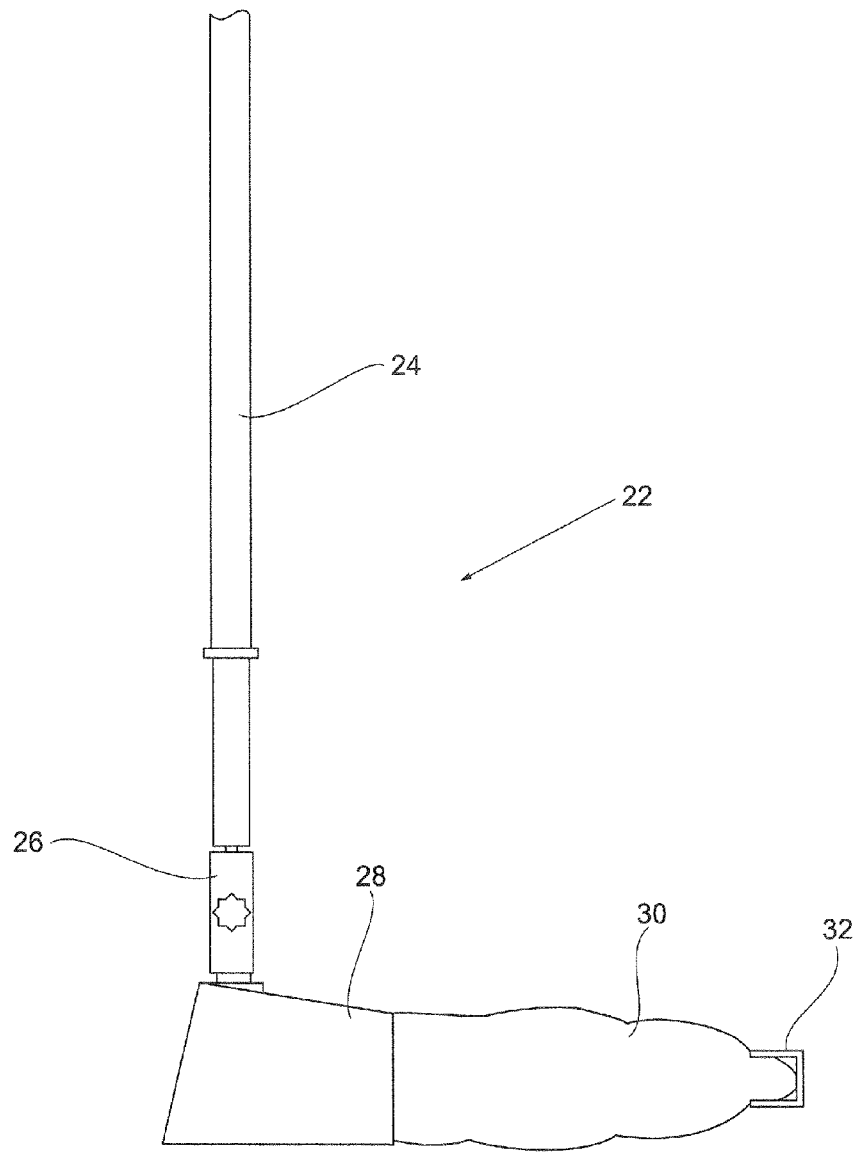
FIG. 14 is a side view of the waste collection apparatus of FIG. 13.
Figure 15:
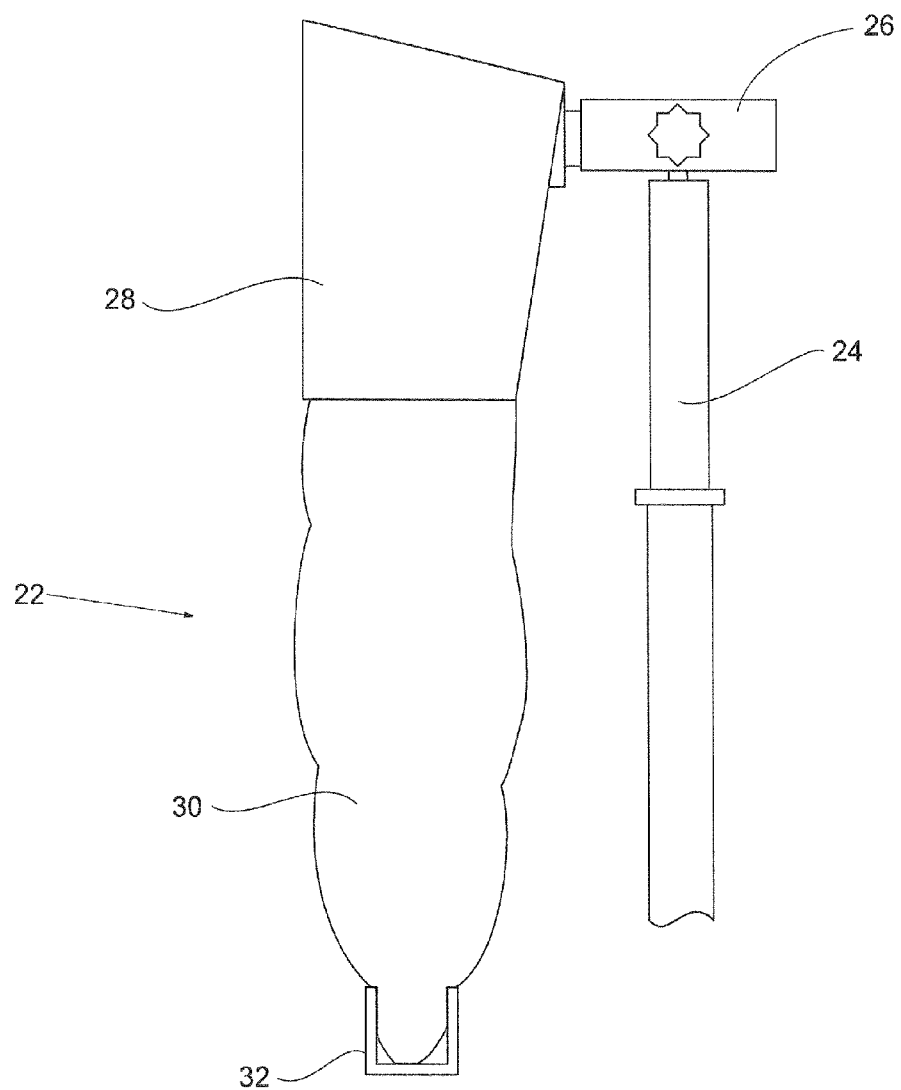
FIG. 15 is a side view of the waste collection apparatus of FIG. 13 showing the waste collection attachment in a position for attachment to a user's belt or pants.

With reference to FIGS. 13-15, a waste collection apparatus 22 may be included with the pick-up tool assembly. The waste collection apparatus 22 may include a telescoping, adjustable handle 24, a connection arrangement 26, a body 28, a bag 30, and a locking mechanism 32. The telescoping, adjustable handle 24 may be configured to adjust to different heights of users of the waste collection apparatus 22. The handle 24 may be extended for taller users or shortened for smaller users. It is to be appreciated that the handle 24 includes any one of a number of telescoping locking arrangements known to be suitable to those having ordinary skill in the art in order to allow the individual components of the handle 24 to engage each other in a sliding/locking telescoping arrangement. For instance, the individual components may be shaped to engage each other frictionally as they are twisted with respect to each other. A distal end of the handle 24 may be connected to the connection arrangement 26. In one embodiment, the connection arrangement 26 is a ball connector that permits rotational movement of the handle 24 relative to the body 28. According to this embodiment, the connection arrangement 26 also includes a clamp screw that may be actuated by the user to close stationary portions of the connection arrangement 26 about the ball connector in order to secure the body 28 and the bag 30 in a particular orientation with respect to the handle 24. Further, in another embodiment, the ball of the ball connector may be inserted into a corresponding clip or bracket (shown in FIG. 16) arranged on the belt or pants of the user. Therefore, when the user is not using the waste collection apparatus 22, the user may clip the waste collection apparatus 22 to his/her belt to free his/her hands for other cleaning activities. The connection arrangement 26 may also be attached to the body 28 of the waste collection apparatus 22. In one embodiment, the body 28 may be made from a hard plastic and define an aperture therethrough. In use, the user may brush or push waste or other objects into and through the body 28. One end of the body 28 may be attached to a bag 30 for collecting any waste or objects pushed through the body 28. The bag 30 may be short in length so as not to drag along the cleaning surface or the bag 30 may be longer in length to accommodate more waste and objects. It is also contemplated that the bag 30 may not be used with the waste collection apparatus 22. Instead, the objects and/or garbage may only be held in the body 28. In one embodiment, the bag 30 may be rolled up to shorten the length of the bag 30. When rolled up, the bag 30 may be attached to the body 28 or may be attached to another portion of the bag 30 itself. In one embodiment, the bag 30 may include one open end attached to the body 28 and one closed end. In another embodiment, instead of a closed end, the bag 30 may include an open end that is held shut with the locking mechanism 32. The locking mechanism 32 may be a slidable lock, a clip, or a bracket used to hold the open end of the bag 30 closed. By using the locking mechanism 32, the user may be able to remove the locking mechanism 32 and empty the contents of the bag 30 through the open end. It is also contemplated that the bag 30 may be emptied by removing the end of the bag 30 from the body 28 and emptying the contents from this end. As mentioned hereinabove and shown in FIG. 16, when the user has clipped the waste collection apparatus 22 to his/her belt or pants, waste or objects may be inserted through the body 28 and into the bag 30, thereby acting as a waste receptacle attached to the belt or pants. It is also contemplated that the waste collection apparatus 22 may be used in conjunction with the pick-up tool to allow the user to pick up waste or objects with the pick-up tool and deposit them into the waste collection apparatus 22 when clipped on the user's belt or pants.

Figure 17:
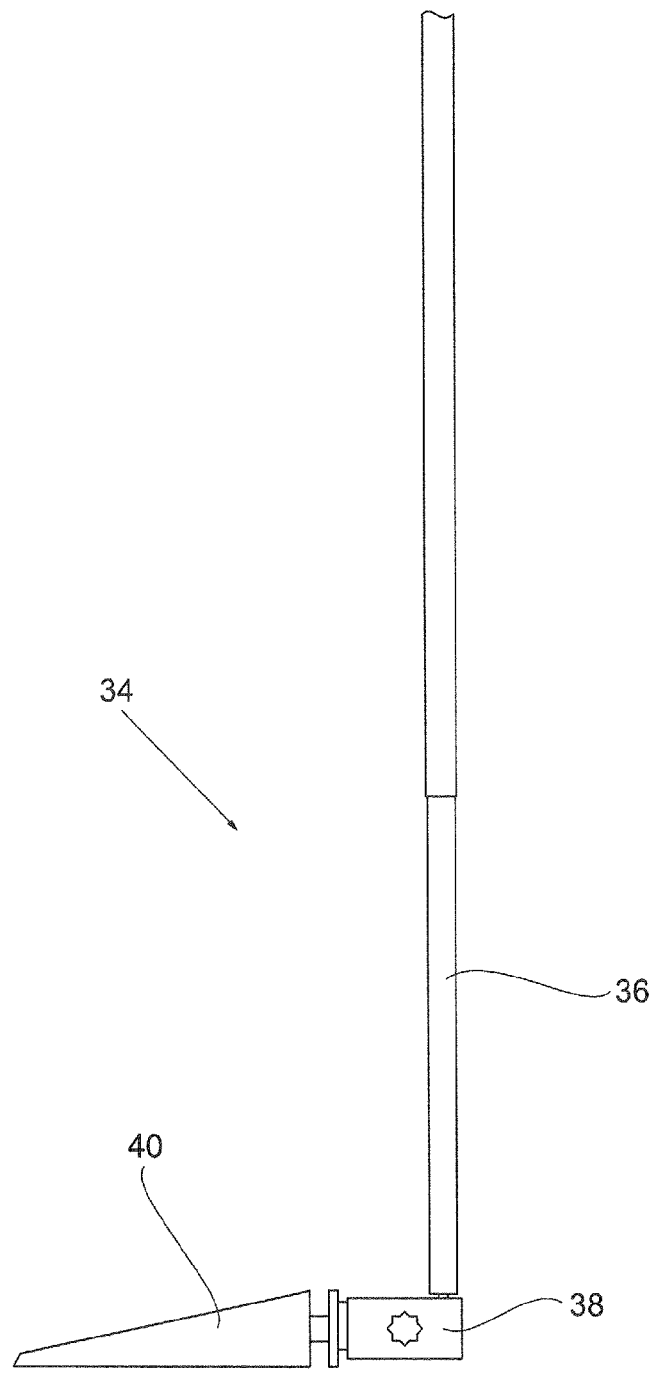
FIG. 17 is a side view of a dust pan apparatus in accordance with this disclosure.
Figure 18:
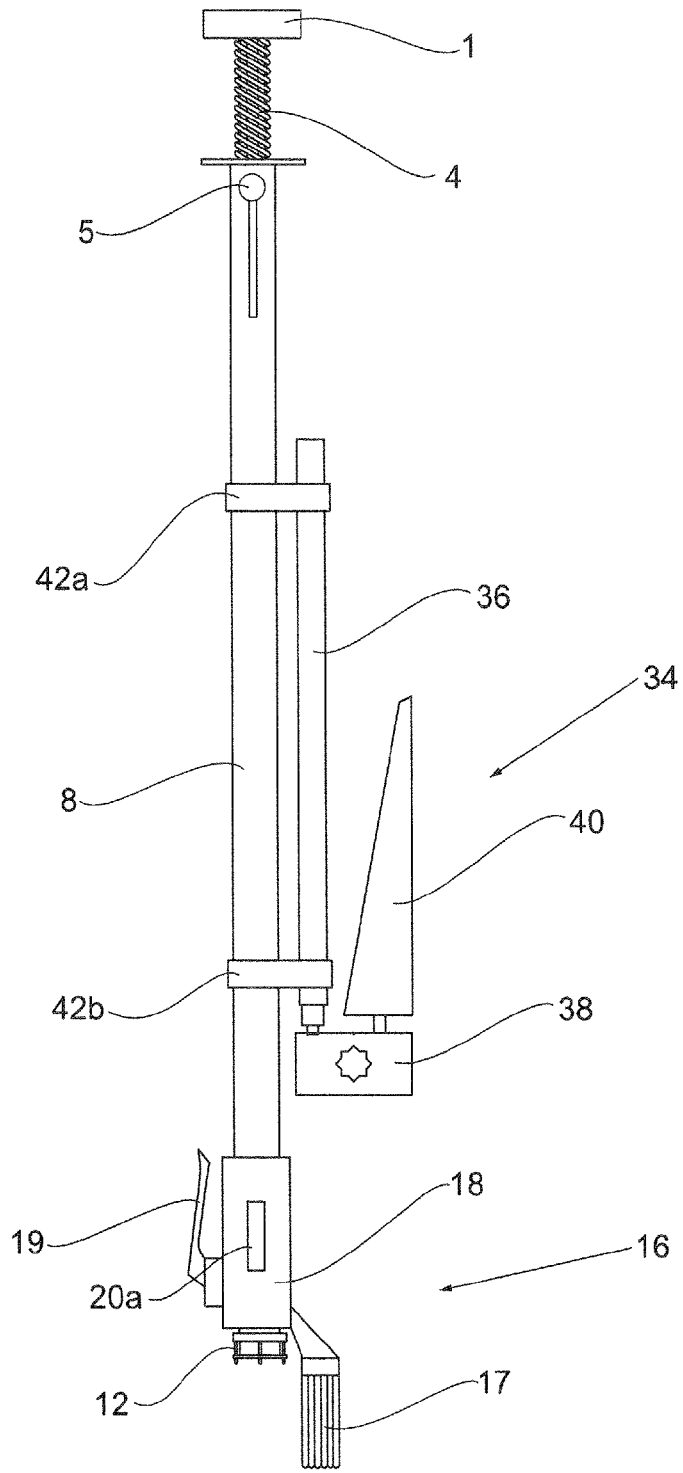
FIG. 18 is a side view of an assembly including the pick-up tool of FIG. 9 and the dust pan apparatus of FIG. 17.

With reference to FIGS. 17 and 18, a dust pan apparatus 34 may also be included in the pick-up tool assembly. The dust pan apparatus 34 may include a telescoping, adjustable handle 36, a connection arrangement 38, and a dust pan 40. The telescoping, adjustable handle 36 may be configured to adjust to different heights of users of the dust pan apparatus 34. The handle 36 may extend longitudinally for taller users or shorten for smaller users in the same manner as the handle 24 discussed above with reference to FIGS. 13-15. The handle 36 may be connected at a distal end to the connection arrangement 38. In one embodiment, the connection arrangement 38 is a ball connector that permits rotational movement of the handle 36 relative to the dust pan 40 in the same manner as the connection arrangement 26 discussed above with reference to FIGS. 13-15. The dust pan apparatus 34 may be designed for use in home or office settings where the waste and/or objects to be picked up are typically not as large as industrial machine shop floors or similar environments. In one embodiment, as shown in FIG. 18, the dust pan apparatus 34 may be removably attached to the main body 8 of the pick-up tool via attachment members 42a, 42b. In one embodiment, the attachments members 42a, 42b are formed in the shape of a "FIG. 8" and include one end that is snap-fit onto the main body 8 and another end that is snap-fit onto the handle 36 of the dust pan apparatus 34. It is also to be understood, however, that alternative connection arrangements may be used, such as a bracket welded or adhesively fastened to the main body 8 or a hook attached to the main body 8 that is configured to hold the dust pan apparatus 34.

With reference to FIGS. 2a-7, several methods for using the universal garbage pick-up tool will be described. One advantage of the pick-up tool is that the tool provides several different ways of picking up objects according to the location, size, and weight of the object. While many conventional pick-up tools include only one method of picking up objects, the present pick-up tool can use up to four different methods to pick up objects.

A first method is described in reference to FIGS. 2a-5. Often an individual will have the need to pick up softer, 3-dimensional materials such as paper, foam, and cloth, among others. The pick-up tool includes a method for picking up these types of material with as little effort and time needed to pick up the material as possible. Using this method, an individual may press down on the push button 1 of the pick-up tool, thereby fully or partially compressing the main spring 4. As the push button 1 is pressed down, the guard members 14 and the pushing rod 6 are also pressed downward towards the distal end of the main body 8. The extended spring claws 11 may be positioned above the object by the individual using the pick-up tool. As shown in FIGS. 3b and 4b, the guard members 14 move in front of the spring claws 11 to protect the more fragile spring claws 11 from contacting any hard surface before the object needed to be picked up, which could result in the spring claws 11 being damaged and/or deformed. As shown in FIGS. 4a, 4b, and 5, as the push button 1 continues to be pressed downward, the spring claws 11 begin to expand and increase the diameter of the spring claws 11 so as to envelope or surround the object to be picked up. As shown in FIG. 5, as the individual releases the pressure on the push button 1, the spring claws 11 begin to retract, allowing the pick-up tool to secure and lift the object from the surface.

Figure 6:
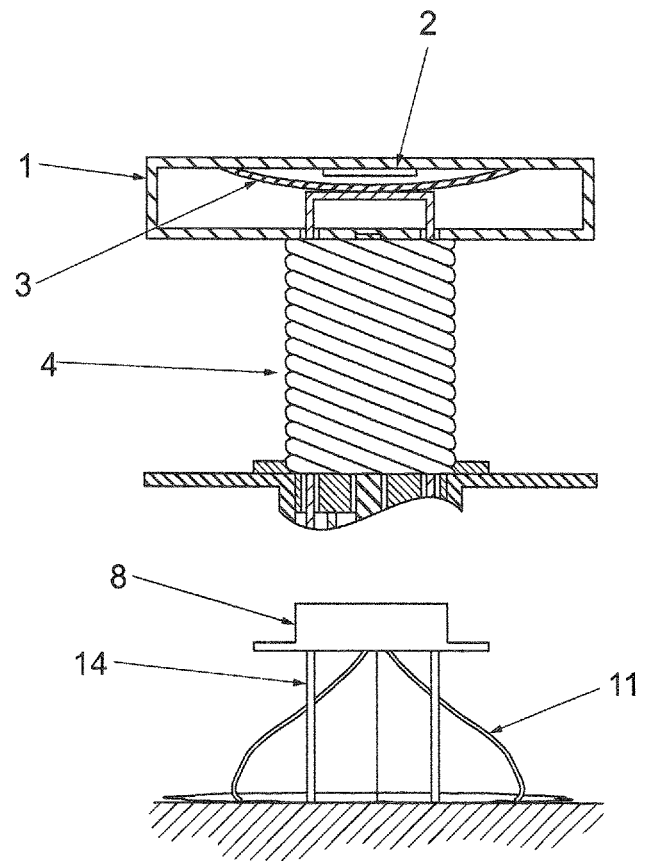
FIG. 6 is a front cross-sectional view of the pick-up tool of FIG. 1 along the line A-A showing a push button, spring element (compressed), guard members, and spring claws in a second position, wherein the spring claws and guard members permit the spring claws to contact the surface and pick up a flat, thin, soft object.

Another method is described in reference to FIG. 6, when the object is flat and soft laying on a hard surface, such as a piece of paper. Once the main spring 4 is fully compressed and the guard members 14 have contacted the surface, the push button 1 can be pressed to further compress the spring element 3 in the push button 1, thereby further increasing the diameter of the spring claws 11. The compression of the spring element 3 changes the position of the guard members 14 and the spring claws 11, relative to one another. The spring claws 11 extend radially away from the main body 8. Because the spring claws 11 spread in a wider diameter, the contact with the hard surface does not damage the spring claws 11. As the individual releases the pressure on the push button 1, the spring claws 11 begin to retract, allowing the pick-up tool to secure and lift the object from the surface. The object will continue to be held in the spring claws 11 as the individual moves the object to a different location. The individual does not need to keep pressure on the push button 1 or hold the pick-up tool in a particular position for the spring claws 11 to hold the object. This is a particular advantage over current pick-up tools in which the individual must keep pressure on the pick-up tool's handle, switch, or button to keep the object retained in the pick-up tool. If the handle, switch, or button is released, the object will also be released. This can produce fatigue in an individual's hand and/or aim as the pick-up tool must be engaged the entire time the object is held. By using the universal garbage pick-up tool, an individual can pick up an object, release the push button 1, and carry the object to a garbage bag or bin. The individual does not need to keep pressure applied on the push button 1 to keep the object retained by the pick-up tool.

Figure 3B:
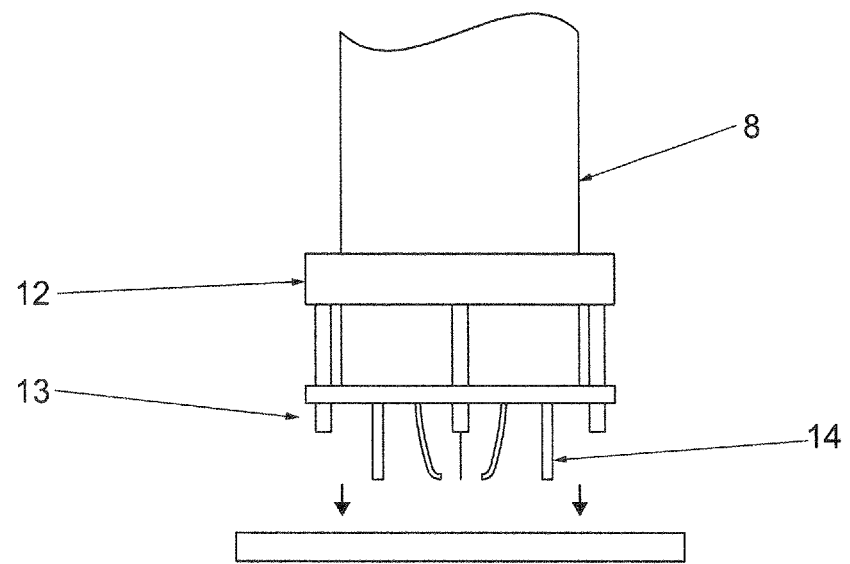
FIG. 3b is a perspective view of an adjustment ring on a distal end of the pick-up tool in FIG. 3a and a released rigid object.

A second method of use for the pick-up tool is illustrated in FIGS. 2b and 3b. This method is used to pick up various firm and dense materials that could not be picked up by the spring claws 11. These types of materials include, among others, plastic, wood, cardboard, or thin metal, such as an aluminum can. The pins 13 of the adjustment ring 12 are used to stab these materials, thereby sticking the materials to the distal end of the main body 8 of the pick-up tool. An individual can either poke the object by using a stabbing motion of the pick-up tool, or the individual can place the pins 13 on top of the object and press down on the base plate 7 of the pick-up tool to stab the object. As with the first method of use for the pick-up tool, the object is retained on the pick-up tool without the need for the individual to keep pressure on a switch or button. Once the individual has moved the object to the desired deposit location, the push button 1 may be pressed down, thereby extending the guard members 14 from the distal end of the main body 8. The guard members 14 may push against the retained object until the object is released from the pins 13. By using this method, an individual can pick up firmer, denser materials and deposit them in a garbage container.

Figure 8:
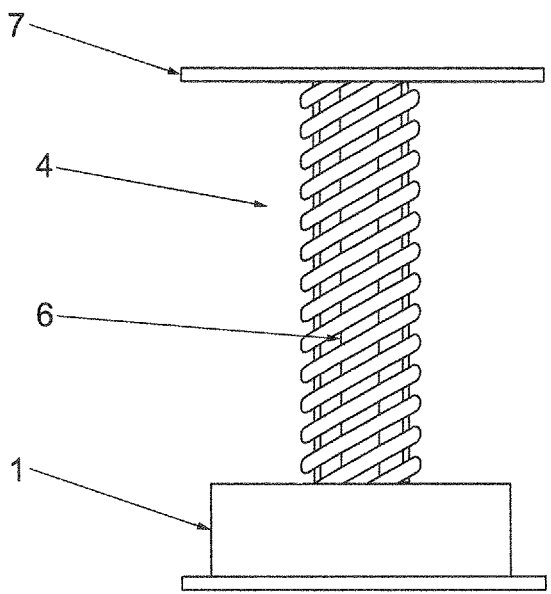
FIG. 8 is a perspective view of a pick-up tool positioned upside down to allow for the use of the magnet inside the push button for picking up objects.

A third method of use for the pick-up tool is explained with reference to FIGS. 2a and 8. The pick-up tool can be rotated upside down by an individual to use the magnet 2 which is contained in the push button 1. The magnet 2 is of sufficient strength to allow an individual to pick up various types of metal, including steel objects. The individual can use a stabbing motion to pick up the metal object with the magnet 2 and deposit the object in the proper receptacle.

A fourth method of use for the pick-up tool is explained with reference to FIG. 7. The extending rod 15 of the pick-up tool may be used to pick up 3-dimensional objects that may be larger in size but easily penetrated, such as aluminum cans, plastic bottles, or small cardboard boxes and any easy-to-penetrate flat objects laying on the soil, such as paper, plastic, or foam. It is also possible to pick up several objects consecutively. The extending rod 15 moves freely within the main body 8 and, in one embodiment, can extend up to several inches below the main body 8. The extending rod 15 may be extended from the main body 8 by pushing or pulling the handle 5 towards the distal end of the main body 8. Once the extending rod 15 has been extended, an individual may use the extending rod 15 to reach objects that may be positioned within a corner, behind a heavy obstacle, or otherwise in a difficult place to reach. Once the object has been reached or brought close to the individual, the individual can stab the object with the extending rod 15, thereby retaining the object on the pick-up tool. The object can then be released by pushing or pulling the handle 5 in a direction towards the proximal end of the main body 8, thereby retracting the extending rod 15 back into the main body 8 and releasing the object. The extending rod 15 may also be used to properly position the pick-up tool over an object before the object is picked up. This allows the individual to ensure that the actual object is being stabbed and not the hard surface that the object is resting on. Another feature of the extending rod 15 is in the assistance of releasing an object from the spring claws 11. Occasionally, a softer object will become stuck on the spring claws 11 when the individual opens the spring claws 11 and attempts to release the object. The extending rod 15 can be extended from the main body 8 in an effort to push the object off of the spring claws 11 and release the object from the pick-up tool.

Figure 9:
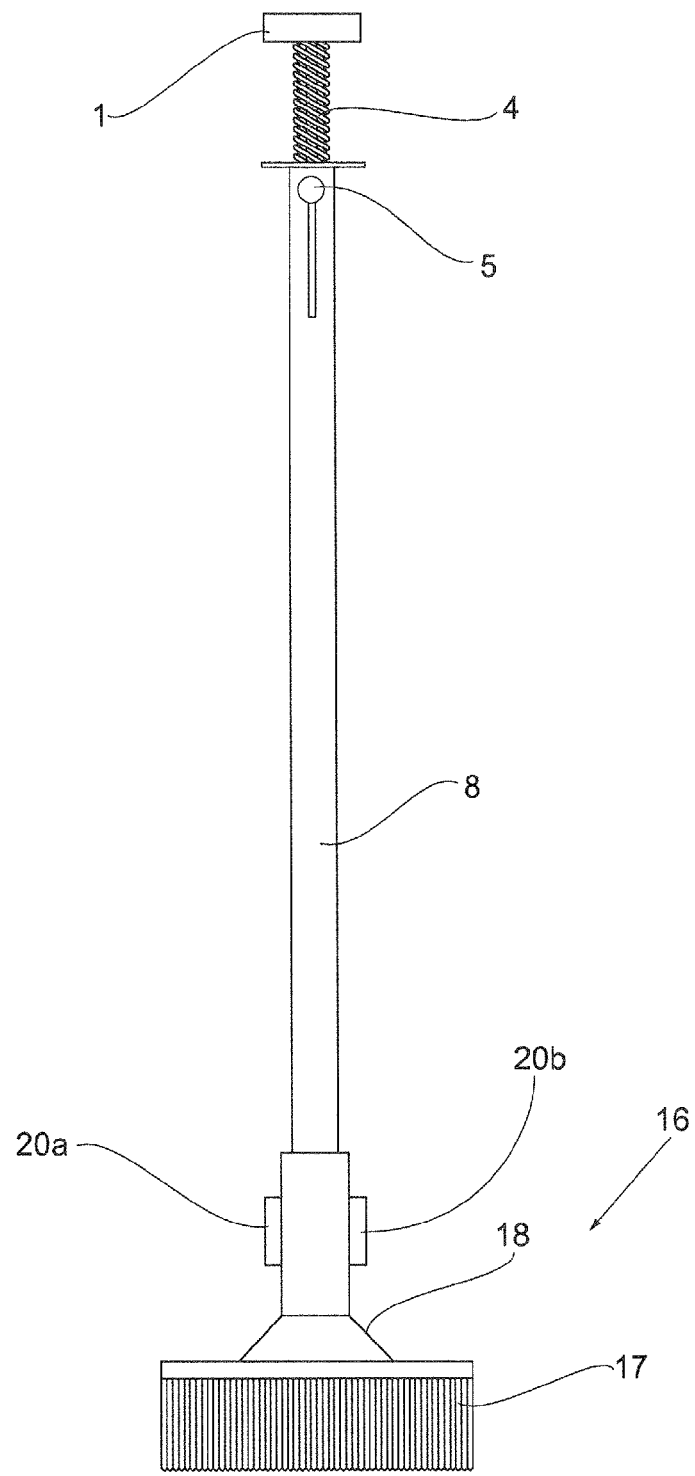
FIG. 9 is a front view of the pick-up tool of FIG. 1 including a broom attachment.
Figure 10:
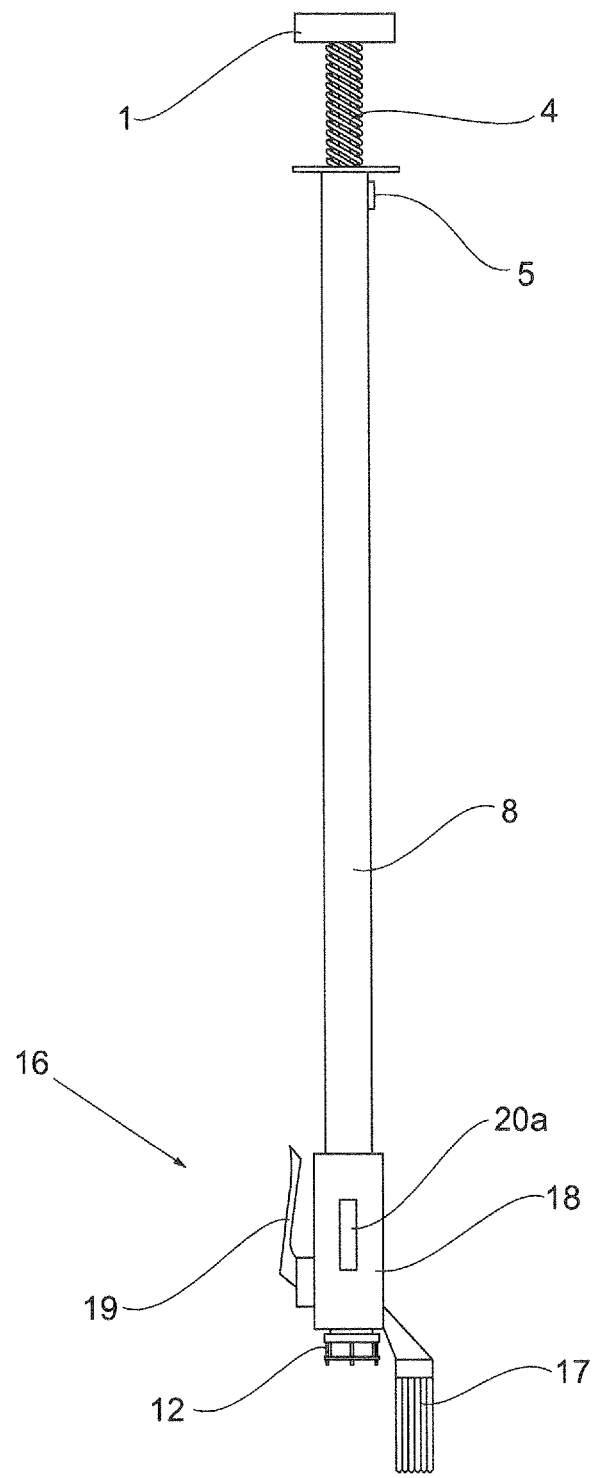
FIG. 10 is a side view of the pick-up tool of FIG. 9.
Figure 11:
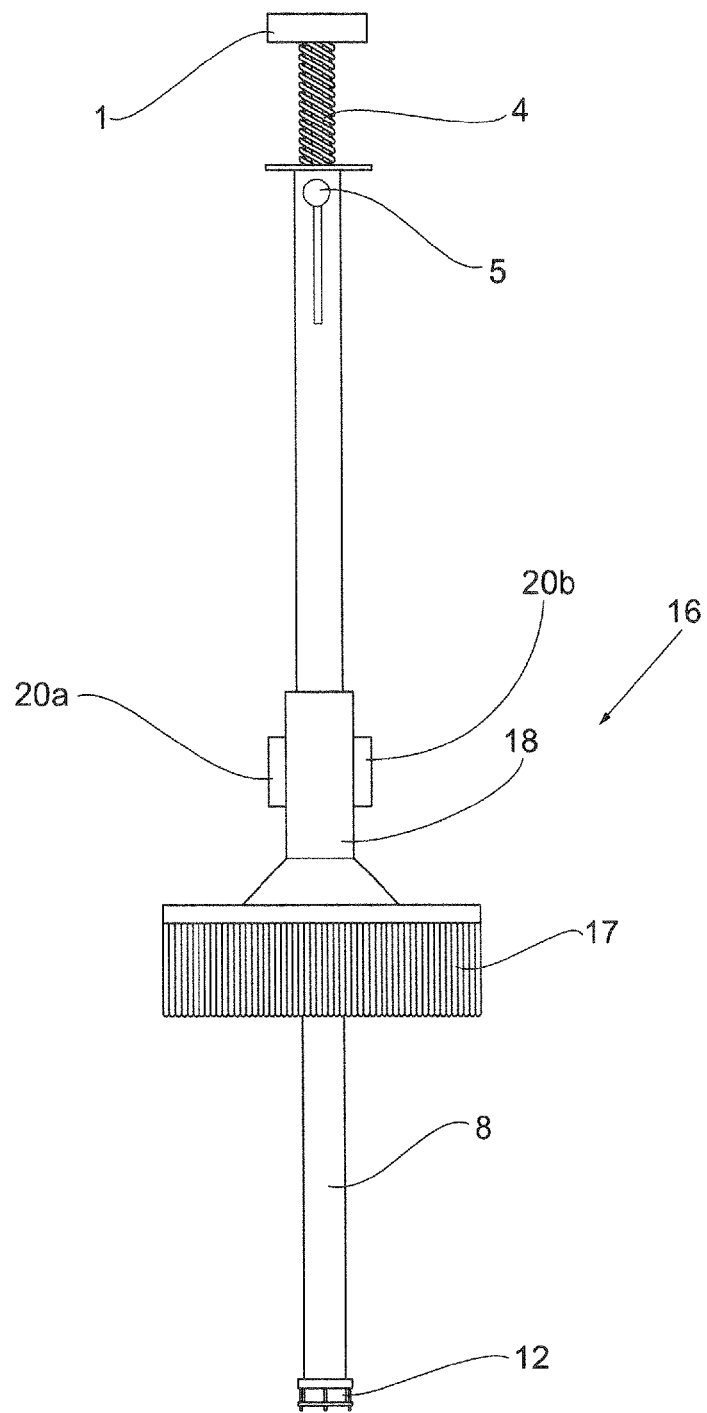
FIG. 11 is a front view of the pick-up tool of FIG. 9 showing the broom attachment in a retracted position.
Figure 12:
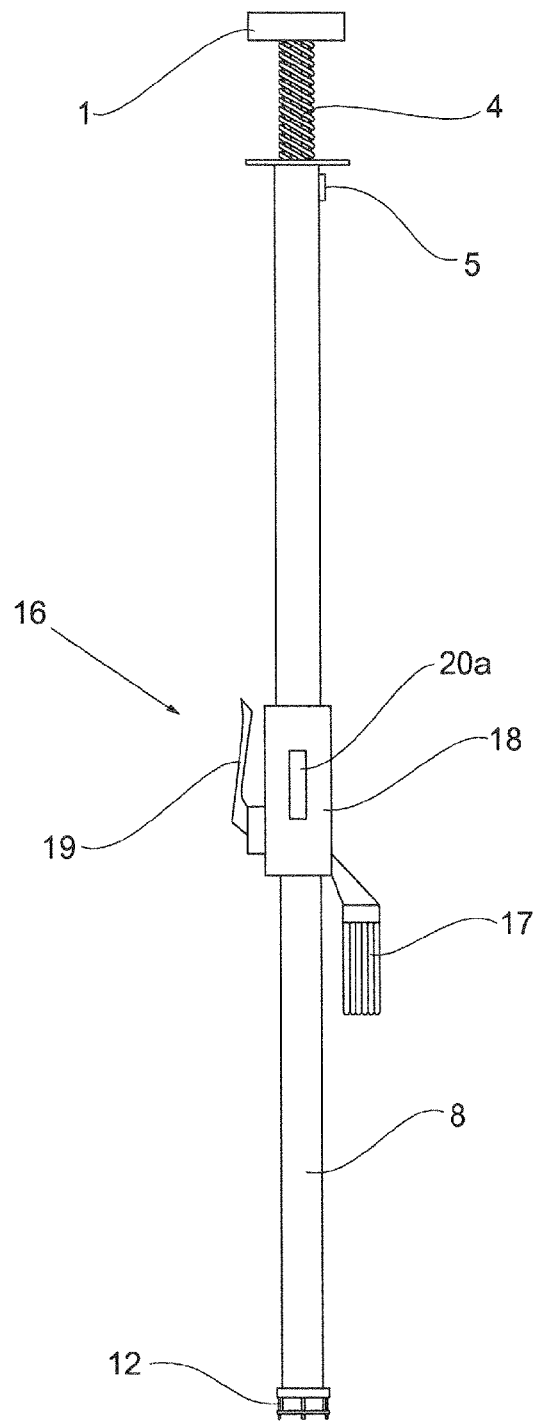
FIG. 12 is a side view of the pick-up tool of FIG. 9 showing the broom attachment in the retracted position.
Figure 16:
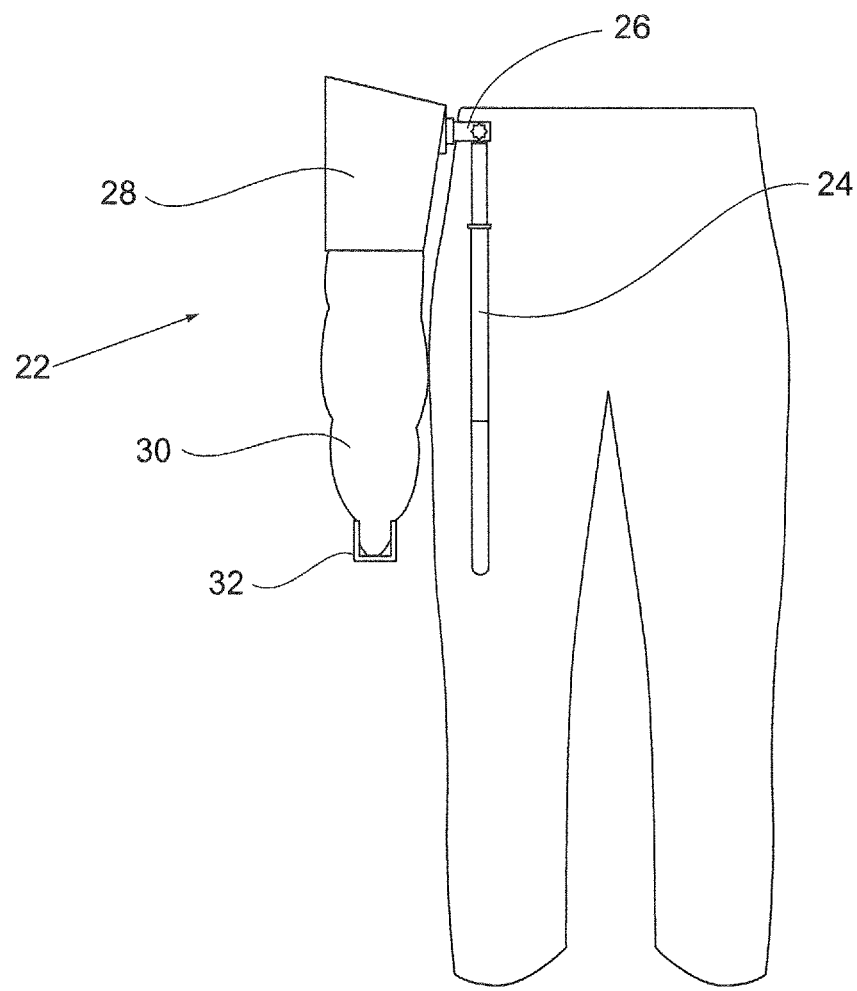
FIG. 16 is a front view showing the waste collection apparatus of FIG. 13 arranged on a user's belt or pants.

A fifth method of use for the pick-up tool is explained with reference to FIG. 9. The broom attachment 16 may be used to brush, sweep, push, or pull waste or objects, such as paper, plastic, or foam, from a surface. A sixth method of use for the pick-up tool is explained with reference to FIGS. 14 and 16. In FIG. 14, the waste collection apparatus 22 may be used to collect waste and any other objects that are swept or pushed into the body 28 via the broom attachment 16. In FIG. 16, the waste collection apparatus 22 may be attached to a user's belt or pants and is configured to allow a user to pick up waste or objects and deposit it in the body 28 of the waste collection apparatus 22. A seventh method of use for the pick-up tool is explained with reference to FIG. 17. A user may use the dust pan apparatus 34 to sweep up dust or small debris that has fallen on a surface. The dust or small debris may be deposited in a garbage can or, in one embodiment, the waste collection apparatus 22 attached to the user's belt or pants.

While several embodiments of a universal garbage pick-up tool are shown in the accompanying figures and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A universal garbage pick-up tool, comprising:
   a main body extending along a longitudinal axis between a proximal end and a distal end;
   an inner support tube positioned inside the main body along a longitudinal axis;
   at least two guard members positioned between the main body and inner support tube, the guard members each extending along the longitudinal axis of the main body between a proximal end and a distal end;
   a pushing rod positioned within the inner support tube, the pushing rod extending along the longitudinal axis between a proximal end and a distal end;
   a push button operatively connected to the proximal end of each guard member and the proximal end of the pushing rod; and
   a plurality of spring claws attached to the distal end of the pushing rod,
   wherein the spring claws are positioned within the inner support tube, and
   the guard members and the spring claws are extended upon the actuation of the push button, thereby allowing the spring claws to extend axially from the distal end of the main body.

2. The universal garbage pick-up tool as claimed in claim 1, further comprising an adjustment ring attached to the distal end of the main body, the adjustment ring including at least two pins circumferentially spaced apart from one another.

3. The universal garbage pick-up tool as claimed in claim 2, wherein the adjustment ring are moved along the longitudinal axis of the main body to adjust an exposed length of each pin.

4. The universal garbage pick-up tool as claimed in claim 2, further comprising an adjustment screw attached to each of the at least two pins,
   wherein the adjustment screws are configured to extend the pins from the adjustment ring upon rotation of the adjustment screws in a first direction and to retract the pins into the adjustment ring upon rotation of the adjustment screws in a second direction.

5. The universal garbage pick-up tool as claimed in claim 1, further comprising a magnet positioned within the push button.

6. The universal garbage pick-up tool as claimed in claim 1, further comprising an extending rod positioned within the main body, the extending rod including a handle on a proximal end of the extending rod which allows for actuation of the extending rod.

7. The universal garbage pick-up tool as claimed in claim 1, further comprising a broom attachment positioned on the main body,
   wherein the broom attachment is slidable along the longitudinal axis of the main body.

8. The universal garbage pick-up tool as claimed in claim 7, the broom attachment comprising at least one lighting arrangement.

9. The universal garbage pick-up tool as claimed in claim 1, further comprising a waste collection apparatus used in conjunction with the pick-up tool, the waste collection apparatus comprising a handle, a body connected to the handle, and a bag attached to one end of the body.

10. The universal garbage pick-up tool as claimed in claim 9, further comprising a locking mechanism attached to an end of the bag opposite the end of the bag attached to the body of the waste collection apparatus,
    wherein the locking mechanism is configured to hold the bag shut during use of the waste collection apparatus.

11. The universal garbage pick-up tool as claimed in claim 1, further comprising a dust pan apparatus removably attached to the main body of the pick-up tool, the dust pan apparatus comprising a handle and a dust pan connected to the handle.

12. The universal garbage pick-up tool as claimed in claim 1, further comprising a spring positioned around the at least two guard members between the push button and the proximal end of the main body.

13. The universal garbage pick-up tool as claimed in claim 1, further comprising a resilient member positioned in the push button and on proximal ends of the least two guard members,
    wherein the resilient member creates a biasing force on the at least two guard members so, when a pressure on the push button is released, the resilient member forces the at least two guard members back into an original position.

14. The universal garbage pick-up tool as claimed in claim 1, wherein the at least two guard members are configured to extend from the main body before the plurality of spring claws extend from the main body upon actuation of the push button.

15. A method of retrieving and picking up refuse and other materials, comprising the steps of:
    providing a universal garbage pick-up tool, comprising:
       a main body extending along a longitudinal axis between a proximal end and a distal end;
       an inner support tube positioned inside the main body along a longitudinal axis;
       at least two guard members positioned between the main body and the inner support tube, the guard members each extending along the longitudinal axis of the main body between a proximal end and a distal end;
       a pushing rod positioned within the inner support tube, the pushing rod extending along the longitudinal axis between a proximal end and a distal end;
       a push button operatively connected to the proximal end of each guard member and the proximal end of the pushing rod; and
       a plurality of spring claws attached to the distal end of the pushing rod,
          wherein the spring claws are positioned within the inner support tube;
    actuating the push button to a first position by pressing the push button towards the distal end of the main body until a spring positioned between the push button and the main body is fully compressed, thereby extending the guard members before the spring claws in the longitudinal direction from the distal end of the main body and allowing the extended spring claws to pick-up a desired object once distal ends of the guard members have touched a surface;
    further actuating the push button to a second position that compresses a spring element positioned within the push button, thereby changing the relative positions of the guard members and the spring claws, causing the spring claws to touch the surface and extend in a radial direction from the distal end of the main body, and allowing the desired object to be picked up and held by the spring claws;
    releasing pressure on the push button causing the spring claws and guard members to retract into the main body of the pick-up tool to hold the desired object in the spring claws; and
    pressing the push button down again to open the spring claws, thereby releasing the object.

16. The method of retrieving and picking up refuse and other materials as claimed in claim 15, further comprising the steps of:
    further providing a magnet within the push button of the pick-up tool; and
    holding a distal end of the pick-up tool to press the magnet and push button against a metal object, thereby picking up the metal object.

17. The method of retrieving and picking up refuse and other materials as claimed in claim 15, further comprising the steps of:
    further providing an adjustment ring attached to the distal end of the main body of the pick-up tool, the adjustment ring including at least two pins circumferentially spaced apart from one another on the adjustment ring;
    stabbing a desired object with the pins of the adjustment ring, thereby retaining, lifting, and carrying the desired object; and
    actuating the push button of the pick-up tool to extend the guard members from the main body, thereby pressing against the desired object and releasing the object from the pins.

18. The method of retrieving and picking up refuse and other materials as claimed in claim 15, further comprising the steps of:

further providing an extending rod positioned within the main body of the pick-up tool, the extending rod including a handle on a proximal end of the extending rod which allows for actuation of the extending rod;

moving the handle towards a distal end of the main body of the pick-up tool, thereby extending the extending rod from the main body;

stabbing a desired object, thereby retaining, lifting, and carrying the desired object; and moving the handle towards a proximal end of the main body of the pick-up tool, thereby retracting the extending rod into the main body and releasing the desired object from the pick-up tool.

19. The method of retrieving and picking up refuse and other materials as claimed in claim 15, further comprising the steps of:

further providing a broom attachment on the main body of the pick-up tool; and sweeping a desired object with the broom attachment.

20. The method of retrieving and picking up refuse and other materials as claimed in claim 15, further comprising the steps of:

further providing a broom attachment on the main body of the pick-up tool and at least one of a waste collection apparatus and a dust pan apparatus removably attached to the main body of the pick-up tool;

sweeping a desired object with the broom attachment into the waste collection apparatus or dust pan apparatus;

and emptying the desired object from the waste collection apparatus or dust pan apparatus into a waste receptacle.

* * * * *